United States Patent [19]

Russell

[11] Patent Number: 5,918,891
[45] Date of Patent: Jul. 6, 1999

[54] SHOPPING CART AND CHILD CARRIER ASSEMBLY

[76] Inventor: Joseph W. Russell, 3013 Carmel Dr., Flossmoor, Ill. 60422-2262

[21] Appl. No.: 08/854,532

[22] Filed: May 12, 1997

[51] Int. Cl.$^6$ .................................................. B62D 39/00
[52] U.S. Cl. .................................. 280/33.991; 280/33.99; 280/33.993; 280/33.992
[58] Field of Search ........................... 280/33.991, 33.992, 280/33.993, 47.38, 47.4, 79.2

[56] References Cited

U.S. PATENT DOCUMENTS

| | | | |
|---|---|---|---|
| 2,911,227 | 11/1959 | Davis | 280/33.99 |
| 3,361,438 | 1/1968 | Davis | 280/33.991 |
| 4,116,456 | 9/1978 | Stover et al. | 280/33.993 |
| 4,867,464 | 9/1989 | Cook | 280/33.993 |
| 5,263,726 | 11/1993 | Wood | 280/33.992 |

FOREIGN PATENT DOCUMENTS 34 44278   12/1984   Germany ........................... 280/33.992

*Primary Examiner*—Robert J. Oberleitner
*Assistant Examiner*—Dan Yeagley
*Attorney, Agent, or Firm*—Wallenstein & Wagner, Ltd.

[57] ABSTRACT

A shopping basket and child carrier cart assembly providing a stable and lower positioned child carrier. The assembly has a cart with a lower frame and a basket chamber, the frame having a plurality of front casters and a plurality of rear casters secured to the bottom of the frame adapted for mobility of the cart upon the casters. The basket has a central chamber defined by basket walls, with a hinged basket rear wall adapted to open to provide a rear opening for receiving a basket of a second cart for stacking such carts. The assembly has a child carrier with a generally horizontal seat platform secured to the cart by a brace member extending outward of the rear wall of the basket chamber, in a position below the rear opening. The assembly further provides an expanded wheel base length of the cart for the rear casters positioned below the child carrier, and provides a safety harness removably secured to the seat platform.

14 Claims, 4 Drawing Sheets

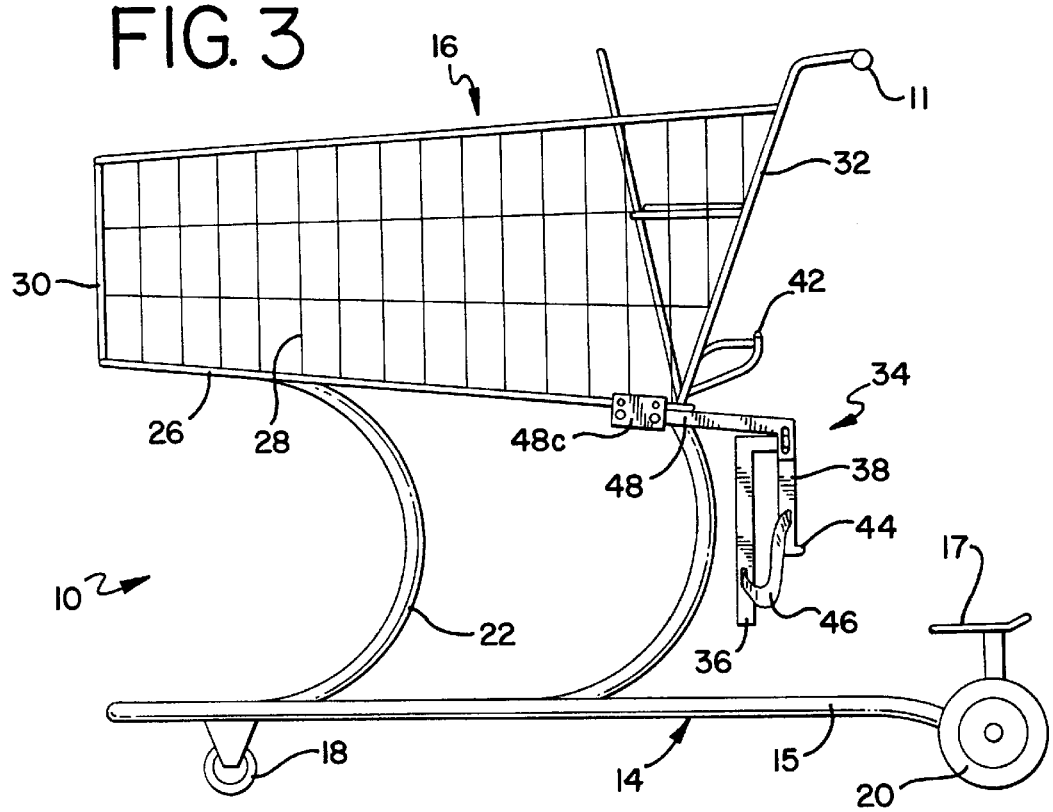
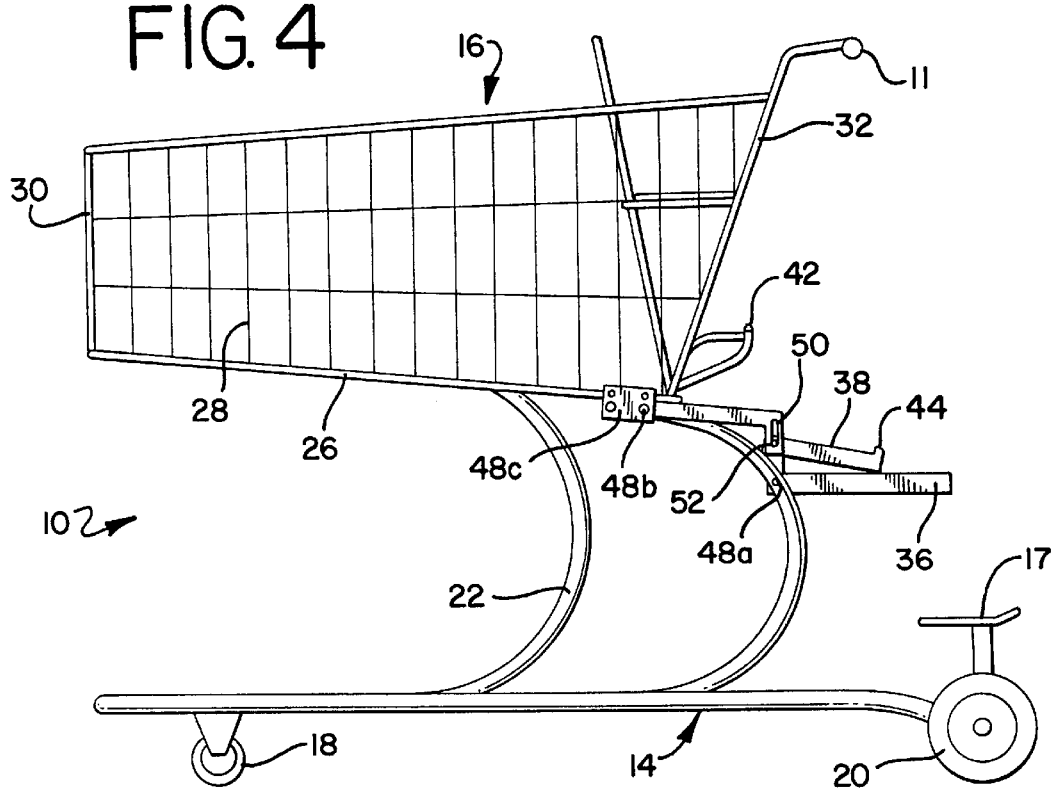

SHOPPING CART AND CHILD CARRIER ASSEMBLY

TECHNICAL FIELD

The present invention relates to cart and child carrier assemblies, namely grocery shopping cart and child-seat assemblies.

BACKGROUND OF THE INVENTION

Shopping carts are often equipped with child carriers, providing a large chamber for carrying groceries or the like, and a seat for carrying a small child. The most common of these types of shopping carts have a trapezoidal shaped basket secured to a frame with casters on the bottom. These types of carts typically have a basket back that is hinged, such that similar designed carts may be stacked within each other by pushing a rear cart into the back of a front cart. The child carrier for these types of carts usually have a secondary back wall which moves forward and rests in the forward position, forming a V-shaped rear wall. A seat platform is positioned between the diverging rear walls, near the top of the shopping basket. This common prior art assembly, therefore, provides a collapsible child seat which, when opened for use, is contained within the shopping basket chamber.

The primary problem with the prior art is that it does not provide for the safe transport of children. More specifically, the cart and child seat assembly described above is positioned with a high center of gravity. This results in a child carrier that is very unstable, especially when the basket of the cart is empty and the cart is more likely to tip over due to the high position of a child in the child seat. Another primary problem inherent with the design described above is that the child seat is located within the basket of the shopping cart. This results in less basket area available for carrying goods, and the possibility for the child to reach into the basket and damage or remove goods.

Another prior art shopping cart and child carrier design is similar to the cart design shown in U.S. Pat. No. 4,116,456. This shopping cart design includes a basket chamber which may be lifted upward to permit stacking of similar carts, with a baby basket located outside and behind the basket. This type of shopping cart and baby basket construction, however, is very unstable because the cart basket has a center of gravity which is too high and which, even though made relatively shallow, has a likelihood of tipping over when goods are placed in the basket. Further, this type of cart assembly does not provide a child carrier that is collapsible. Also, although this design of prior art shopping cart assembly permits stacking of similar carts, such stacking of carts is difficult because the front of each cart must first be lifted upward. Therefore, although this type of cart provides a baby basket which is outside the basket and is positioned at least slightly below the basket, the basket is positioned with a dangerously high center of gravity, the child carrier is not collapsible, and the carts are difficult to stack together.

In sum, the prior art shopping carts are not well suited for providing a stable cart with a child seat in a convenient and safe location. The prior art shopping carts either have the child seat or the basket with a center of gravity which is too high to provide stability. The prior art shopping carts with lower baskets and easy stacking features have child carriers which jeopardies stability of the cart, and which consume valuable space within the baskets. On the other hand, the prior art shopping carts which have a lower child carrier positioned outside the main basket are unstable due to the basket being too high, and require lifting the basket up before stacking carts together.

Yet another problem with the prior art shopping carts and child carriers is the lack of safety features associated with the child carrier, such as shoulder or chest harnesses, primarily because the child carrier of the prior art shopping carts are poorly positioned relative to the main basket. An over-the-shoulder strap, or otherwise described as a chest harness, if used on the prior art shopping carts, would be obstructive. In the case of the first type of cart described above, a harness assembly would get in the way of the stacking of carts, and would likely obstruct the placement of the secondary back wall in the non-use position. Indeed, when these types of carts are fitted with a waist strap, the clip mechanism of the waist strap is often damaged and unusable. With regard to the other types of prior art shopping carts described above, a harness assembly would obstruct the stacking of carts together, primarily because the bar supporting the basket of a rear cart would be blocked from interfitting with the front cart.

Injury to children due to the instability of shopping carts and poor designs for the placement of child carriers on shopping carts is prevalent. Because of the problems discussed above with regard to prior art shopping carts, and the unreasonable risk to children caused by those prior art shopping cart designs, there is a need for a shopping cart having a stable construction and low center of gravity, with a child carrier that does not compromise the safe positioning of the child or the use of a shoulder or chest harness. The present invention addresses those needs, providing a safe design of a shopping cart and child carrier, maintaining easy stacking of carts together, and providing a lowered center of gravity and improved wheel-base stability for both the basket and the child carrier.

SUMMARY OF THE INVENTION

It is an object of the present invention to provide a shopping basket and child carrier cart assembly which has a cart with a lower frame and a basket chamber. The frame has a plurality of front casters and a plurality of rear casters secured to the bottom of the frame adapted for mobility of the cart upon said casters, and upper frame members having a surface adapted for securing the basket chamber to the frame. The basket chamber has a substantially horizontal bottom wall, two generally opposed side walls, a generally vertical front wall, a generally vertical rear wall hingeably secured in position and adapted to rotate about the hingeable attachment to permit stacking a like cart structure within said basket chamber. A collapsible child carrier is attached to the cart below the basket chamber and has a generally horizontal seat platform and a hingeably-connected backrest. The backrest has a hingeable connection to permit rotation about an axis of rotation between a first position substantially perpendicular to the seat platform, and a second position substantially parallel and adjacent to the said platform. The carrier has a means for detachably locking the backrest in the first position for use of the child carrier. It is further an object of the present invention to provide a shopping basket and child carrier assembly having a seat platform positioned below the basket chamber to provide a stable cart assembly with a low and stable center of gravity and a child carrier that does not obstruct stacking of like carts together.

Other advantages and aspects of the present invention will become apparent upon reading the following description of the drawings and detailed description of the invention.

BRIEF DESCRIPTION OF THE DRAWINGS

FIG. 3 is a side view of the shopping cart and child carrier assembly of the present invention shown in collapsed position when the child carrier is not in use;

FIG. 4 a side view of an alternative embodiment of the shopping cart and child carrier assembly of the present invention shown in collapsed position when the child carrier is not in use;

DETAILED DESCRIPTION

Figure 1:
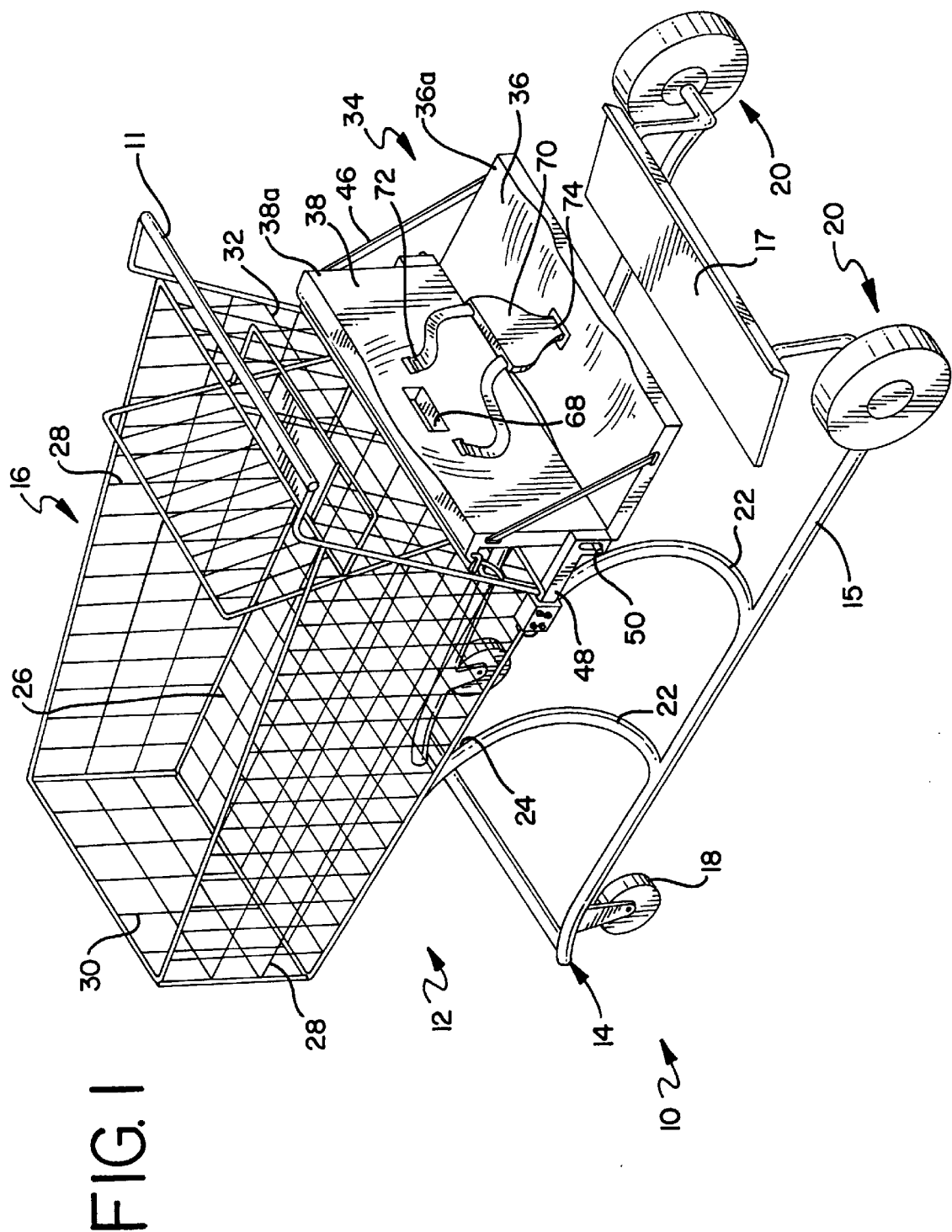
FIG. 1 is a perspective view of the shopping cart and child carrier assembly of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

The shopping basket and child carrier cart assembly 10 of the present invention has a cart 12 with a lower frame 14 and a basket chamber 16. The lower frame 14 has at least a plurality of front casters 18 and rear casters 20 on the bottom of the frame 14 to permit mobility of the cart assembly 10 by the user exerting a pushing force on the handle 11. The rear casters are preferably extended rearward of the basket chamber 16, providing an extended wheel base length, preferably by having extended lower frame members 15. The cart assembly 10 has upper frame members 22, which provide an upper surface 24 for securing the basket chamber 16 to the frame 14. This feature providing an extended wheel base length is adapted to provide increased stability of the assembly 10, and provides a position for optionally mounting a foot rest 17.

The basket chamber 16 is constructed of a bottom basket wall 26 which is substantially horizontal, and generally opposing side basket walls 28. The basket chamber 16 has a generally vertical front wall 30 and a generally vertical rear wall 32, which is hingeably secured to the basket to permit movement of the rear wall 32 about an axis of rotation to permit another similar cart basket chamber to be received for stacking carts in telescoping fashion. The axis of rotation of the rear wall 32 is preferably at or near the top of the rear wall 32, and the rear wall 32 is preferably at a slight angle from being directly vertical. This arrangement permits the carts to be stacked together in a telescoping fashion by merely pushing a rear cart within the back of a front cart, causing the rear wall 32 of the front cart to lift and rotate about the hinge axis of rotation. To permit the stacking of carts in telescoping fashion, the basket chamber 16 preferably has a tapered shape such that the front wall 30 has a width smaller than the rear wall 32, and the bottom wall 26 slopes slightly upward toward the front wall 30. In this manner, the inner chamber 16 is tapered toward the front wall 30.

The child carrier 34 of the assembly 10 has a generally horizontal seat platform 36 and a backrest 38 which is substantially perpendicular to the seat platform 36, such that the backrest 38 is generally vertical. The seat platform 36 is positioned outside and below the basket chamber 16, preferably at or near the height of the bottom basket wall 26. When not in use, the backrest 38 is rotated about a hinged connection 40 axis of rotation A—A (FIG. 2), such that the backrest 38 is collapsed toward the seat platform 36 to be adjacent and substantially parallel to the seat platform 36 (FIGS. 3 and 4). When in collapsed position, both the seat platform 36 and the backrest 38 are below the basket chamber 16. This feature, the collapsed child carrier 34 being entirely below the basket chamber 16, permits the basket of a rear cart to be stacked within the basket chamber 16 without any restriction by the child carrier 34. When the backrest 38 and the seat platform 36 of the child carrier 34 are expanded into a use position, the child carrier provides a low center of gravity for the child, no higher than that of basket chamber 16. Accordingly, one important aspect of the present invention is that the child carrier 34 is positioned on the rear of the cart behind the basket chamber 16, and the entire child carrier 34 is collapsible to a non-use position in which it is below the inner chamber 16, and preferably at a height below or equal to the height of the bottom wall 26. Another important feature of the present invention is that, when the child carrier 34 is expanded to a use position, the carrier 34 provides a low center of gravity for the child, no higher than the basket chamber 16.

Figure 2:
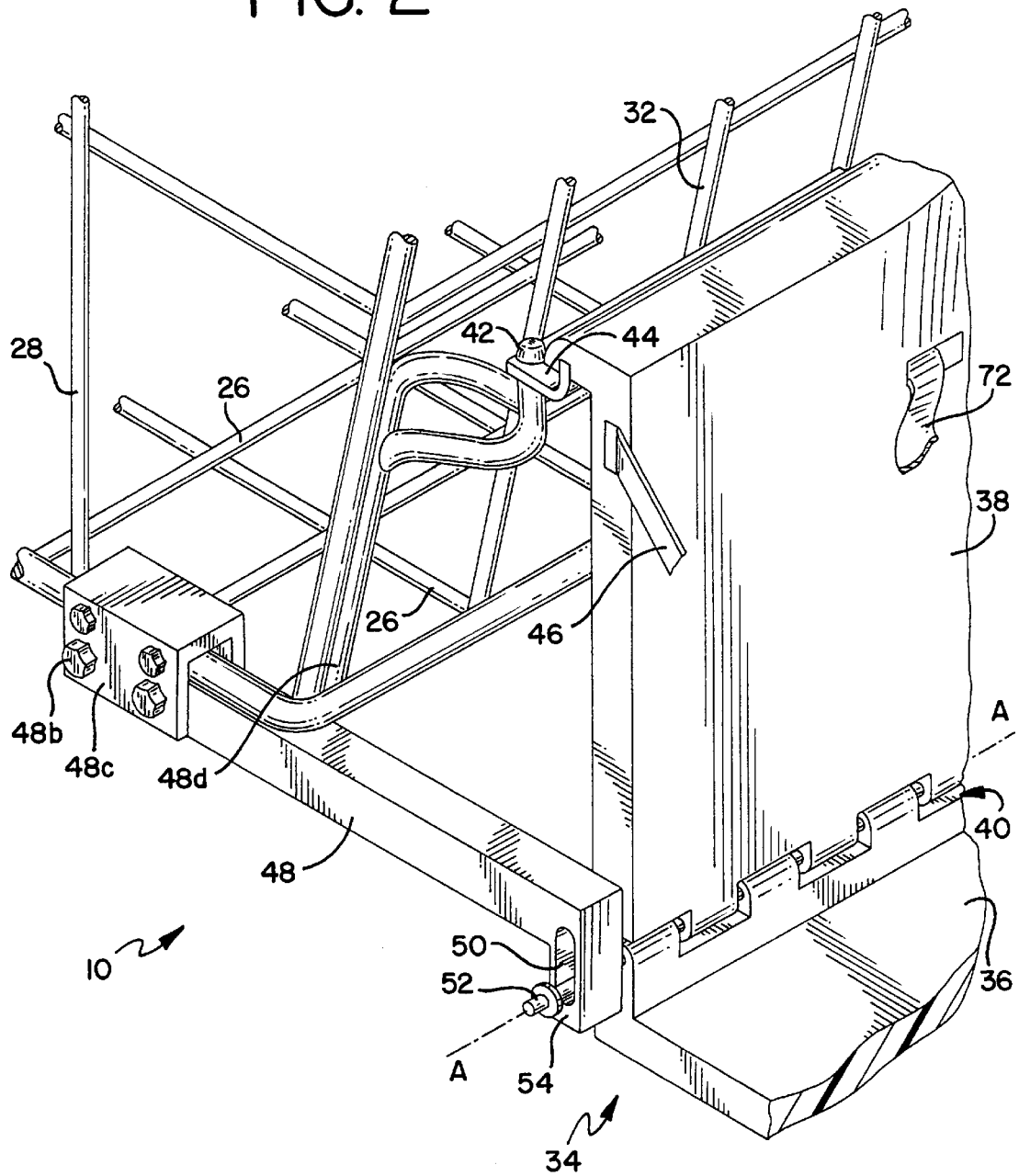
FIG. 2 is a partial sectional view of the assembly shown in FIG. 1.

The assembly 10 has a means for locking the backrest 38 in upright, generally vertical position. The means for such locking of the backrest 38 may include any manner of mechanical locking mechanisms, including a preferred embodiment with engagement of a projection 42 into a receiver 44. Other suitable means for locking the backrest 38 in upright position include engagement of a projecting clip with mating receiver (FIG. 5) or with a portion of the basket back, or may include magnetized attachments (not shown). In the preferred embodiment, the means for locking the backrest 38 upright includes a projection 42 engageable with a receiver 44, the receiver 44 preferably being an aperture which receives the projection 42, as best shown in FIG. 2. This preferred embodiment is adapted to at least partially support the backrest 38 and the seat platform 36 by hanging from the connection of the projection 42 and the receiver 44.

Further, in this preferred embodiment, at least one truss member 46 extends between an upper portion 38a of the backrest 38 and a distal portion 36a of the seat platform 36. The truss member 46 is preferably flexible, constructed of cloth or synthetic webbing material, or a similar material which is adapted to collapse and not restrict the backrest 38 from its non-use position adjacent the seat platform 36, such as is shown in FIG. 3, yet is adapted to provide support for the seat platform 36 when in the use position, as shown in FIG. 1. When the backrest 38 is locked in upright position, the truss member 46 is placed in tension to provide hanging support of the seat platform 36. Preferably, a truss member 46 is positioned on each side of the backrest 38, each extending to the relative side of the seat platform 36 (FIG. 1).

The assembly 10 of this preferred embodiment also has a means for engaging and disengaging the projection 42 and receiver 44. The preferred embodiments of such means for engaging/disengaging include misalignment/alignment of either the projection 42 or the receiver 44 relative to the other. Other such means for engaging and disengaging the projection and receiver include mechanical movement of a sliding clip, which is integral with the projection 42 or the receiver 44. One example of such a slidable clip is an arm (not shown) extending from the projection 42 which passes through a channel (not shown) in the backrest 38, whereby movement of the arm within the channel affects movement of the projection 42 relative to a stationary receiver 44. The arm may alternatively be spring-biased, such that the projection 42 is biased toward the extended position, without actual lifting of the backrest 38.

In the preferred embodiment, the means for engaging and disengaging the projection 42 and receiver 44 is provided by the backrest 38 having a movable axis of rotation (A—A of FIG. 2), permitting the backrest 38 axis of rotation (A—A) to be raised and lowered. In this embodiment, the axis of rotation (A—A) of the backrest 38 is raised, the projection 42 is aligned with the receiver 44, and the backrest axis of rotation (A—A) is lowered to engage the projection 42 with the receiver 44. In other words, the body of the backrest 38 and its pivot point is displacable, in that it may be raised upward by lifting the backrest 38, preferably by a suitable handle 68, such as a recess in the backrest. When the body of the backrest 38 is lifted, the projection 42 and receiver 44 may be aligned; and, when the backrest 38 is subsequently lowered, the projection and receiver are engaged. Disengagement of the projection 42 and receiver 44 is achieved by lifting to displace the body of the backrest 38 upward, and mis-aligning the projection 42 and receiver 44 before lowering the backrest 38.

Figure 5:
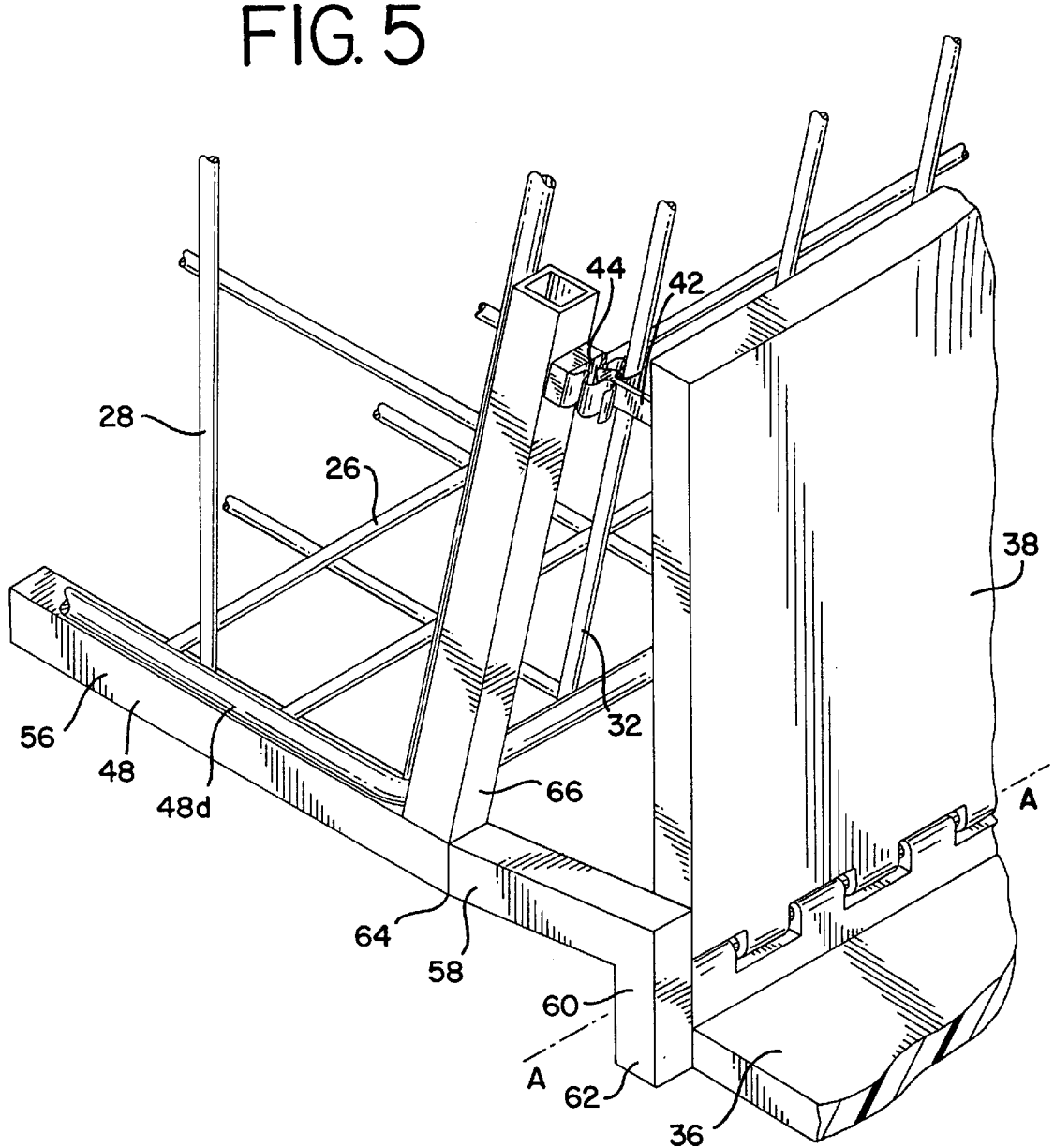
FIG. 5 is a partial sectional view of an alternative embodiment of the cart and child carrier of the present invention.

In one preferred embodiment of this aspect of the present invention, the seat platform 36 is secured to the cart 12 in a fixed horizontal position below the basket chamber 16 by at least one brace member 48, and only the backrest 38 is hinged. The at least one brace member 48 preferably includes a pair of brace members 48, each located on opposite sides of the seat platform 36, such as shown in FIG. 5. As is shown in FIG. 4, the seat platform 36 may also be secured in the generally horizontal position by also being fastened to a portion 48a of the upper members 22 of the lower frame 14 of the cart 12. The brace members are securely fastened to the cart, preferably secured to the lower frame of the cart by a fastener 48b, a fastener bracket 48c, a weld 48d (FIG. 5) or a combination of the above.

Each brace member 48 preferably has an aperture 50 for receiving a pivot pin 52 extending outward from opposing sides of the backrest 38, to thereby provide a pivot assembly 54 with an axis of rotation A—A of the backrest 38. Preferably, the pivot assembly 54 of the backrest 38 is provided by a pivot pin 52 and slot-like aperture, similar to the embodiment of FIG. 4. In this embodiment, the backrest 38 is rotated about its axis of rotation A—A to a generally vertical position, and only the backrest 38 is raised to engage the projection 42 with the receiver 44.

In another embodiment the seat platform 36 and backrest 38 are rotatably secured to the cart 12, and both are lifted together to permit the engagement and disengagement of the projection 42 and receiver 44. This embodiment is shown in FIGS. 1, 2 and 3, and incudes the truss members 46 for supporting the seat platform, as discussed above.

In yet another embodiment, the means for engaging and disengaging the projection 42 and receiver 44 includes direct alignment of the projection 42 and receiver 44, such as shown in FIG. 5. In this embodiment, one of either the receiver 44 or projection 42 is positioned on the backrest 38, and the other of the projection 42 or receiver 44 is positioned on the rear portion of the cart, either on the rear wall 32 or on the rear portion of the cart frame 14. The axis of rotation A—A of the backrest 38 of this embodiment is not adapted to be movable, as it is intended that the projection 42 and the receiver 44 directly align when the backrest 38 in rotated upward about the axis of rotation (A—A). Because the seat platform 36 of this embodiment is secured in generally horizontal by at least one brace member 48, it is not necessary to have truss members, as was described above with regard to FIGS. 1 and 2. In the embodiment shown in FIG. 5, at least one brace member 48 has a lower surface 56 for contacting and securing a portion of the basket, and an extending portion 58 extending rearward of the cart and secured to the seat platform 36. The extending portion 58 preferably has a downward bend 60 to provide a downwardly extending arm 62 for securement of the seat platform 36. The extending portion 58 also preferably has an inward bend 64 immediately adjacent the cart, and an upwardly extending arm 66 adapted to provide attachment of either the projection 42 or the receiver 44.

The child carrier 34 of the present invention also has a safety harness 70, preferably a three-point shoulder harness as shown in FIG. 1. The safety harness 70 has at least one first segment 72 secured to the backrest 38 and a second segment 74 removably attached to the seat platform 36. Preferably, the safety harness has two first segments 72 adapted to each brace over a shoulder of a child sitting in the child carrier 34, and a single second segment which is adapted to removably attach to the seat platform 36 between the legs of a child seated in the child carrier 34.

Although the dimensions of the shopping cart 12 and child carrier 34 may differ depending upon the selection of the embodiment of the present invention and other variables, some optimal dimensions exist for providing a suitable and stable child carrier. For example, the typical shopping cart 12 with a child carrier 34 according to the present invention has a wheel-base length, from front casters 18 to rear casters 20, of approximately 30–40 inches, and a maximum wheel-base width of approximately 20–26 inches. The height to the top of the handle 11 is approximately 38–42 inches, and the bottom of the basket chamber 16 is less than 24 inches high from the bottom of the casters. The seat platform 36 is preferably between 9–11 inches in depth, and the backrest 38 is greater than 7 inches in height but preferably 10–14 inches in height. As is discussed above, the seat platform 36 is secured to the cart 12 just below or at the height of the bottom wall 26 of the basket chamber 16. Preferably, the height of the seat platform 36 is at least one inch below the bottom of the bottom wall 26 of the basket chamber 16 and no greater than 24 inches above the floor, thus providing a low center of gravity and being in a position which will not obstruct stacking of carts together. The wheel-base length is preferably expanded such that the rear casters 20 are positioned at least partially beneath the child carrier 34, thereby having a wheel-base that extends rearward of the cart basket chamber 16, preferably extending at least 6 inches from the back end of the bottom basket wall 26. The brace member 48 is preferably secured to the bottom basket wall 26 and the bend 60 provides a downwardly extending arm 62 that is adapted to secure the seat platform 36 in a position below the bottom basket wall 26 at least the thickness of the backrest 38, preferably at least 1 inch below the bottom basket wall 26.

While the specific embodiments have been illustrated and described, numerous modifications come to mind without significantly departing from the spirit of the invention and the scope of protection is only limited by the scope of the accompanying claims.

I claim:

1. A shopping basket and child carrier cart assembly, comprising:

a cart having a lower frame and a basket chamber, said frame having a plurality of front casters and a plurality of rear casters secured to the bottom of the frame adapted for mobility of the cart upon said casters, an upper frame members having a surface adapted for securing the basket chamber to the frame, said basket chamber having a substantially horizontal bottom wall, two generally opposed side walls, a generally vertical front wall, a generally vertical rear wall secured in position by a hingeable attachment and adapted to rotate about said hingeable attachment to provide a rear opening adapted to permit stacking a like cart structure within said basket chamber;

a collapsible child carrier attached to the cart below the rear opening of the basket chamber, the child carrier having a generally horizontal seat platform and a hingeably-connected backrest, said backrest having a hingeable connection to permit rotation about an axis of rotation between a first position substantially perpendicular to the seat platform, and a second position substantially parallel and adjacent to the said platform wherein said backrest is positioned below said basket opening; a means for detachably locking the backrest in said first position for use of the child carrier.

2. The shopping basket and child carrier cart assembly of claim 1, wherein the seat platform being hingeably connected to the cart to rotate about the hingeable connection between a first generally horizontal position, and a second position wherein the seat platform extends downward below said basket bottom wall.

3. The shopping basket and child carrier cart assembly of claim 2, wherein said seat platform is hingeably connected to the cart by a pivot assembly, the pivot assembly having a pivot pin extending from opposing sides of said seat platform, and a plurality of brace members integrally attached to the cart, each said brace member having an aperture suitable for receiving a pivot pin extending from the seat platform.

4. The shopping basket and child carrier cart assembly of claim 3, wherein the aperture of each brace member is a generally vertically-extending slot passing through the brace member, said slot permitting generally vertical movement of the pivot pin adapted to permit upward and downward movement of the seat platform and backrest assembly;

said means for detachably locking the backrest in said backrest first position includes a projection extending from either the backrest or the cart, and a receiver on the other of said either the backrest or the cart, the backrest being rotatable to a generally vertical position and said upward and downward movement of the seat platform and backrest assembly permitting locking of said backrest by alignment and insertion of said projection with said receiver.

5. The shopping basket and child carrier cart assembly of claim 1, further comprising the seat platform being hingeably connected to the cart to rotate about the hingeable connection between a first generally horizontal position and a second position wherein the seat platform extends downward below said basket bottom wall;

a plurality of truss members at each of two sides of the child carrier, each truss extending between the seat platform and the backrest, such that the seat platform is at least partially supported in said first generally horizontal position by each truss extending from the backrest in a first backrest position substantially perpendicular to the seat platform.

6. The shopping basket and child carrier cart assembly of claim 1, wherein the means for detachably locking the backrest in said first position being a locking mechanism having at least one projection removably engaged with a receiver, said at least one projection extending from either the backrest or the cart, said receiver being located on the other of said either the backrest or the cart.

7. The shopping basket and child carrier cart assembly of claim 6, wherein said hingeable backrest attachment being adapted to permit upward and downward movement of the backrest axis of rotation, such that the receiver and projection are removably engaged by upward movement of the backrest axis of rotation and subsequent alignment of the projection and receiver followed by downward movement of the backrest axis of rotation.

8. A shopping basket and child carrier cart assembly, comprising:

a cart having a lower frame and a basket chamber, said frame having a plurality of front casters and a plurality of rear casters secured to the bottom of the frame adapted for mobility of the cart upon said casters, said basket having a central chamber defined by basket walls and a hinged basket rear wall adapted to open to provide a rear opening for receiving a basket of a second like cart;

a child carrier having a generally horizontal seat platform being positioned outside said basket central chamber and being collapsible to a non-use configuration wherein the child carrier is disposed below said rear opening.

9. The shopping basket and child carrier cart assembly of claim 8 wherein the child carrier having a backrest extending in an open position upward from the seat platform generally perpendicular to the seat platform, the backrest being rotatable about an axis of rotation from said open position to a collapsed position said backrest in the collapsed position being disposed at an angle other than generally perpendicular to the seat platform.

10. The shopping basket and child carrier cart assembly of claim 9 wherein a brace member having a downwardly extending arm adapted to secure the seat platform below the rear opening at a distance greater than a greatest thickness of the backrest.

11. The shopping basket and child carrier cart assembly of claim 9 wherein a restraining harness extends from at least one first segment secured to said backrest and a second segment removably secured to the seat platform.

12. The shopping basket and child carrier cart assembly of claim 11, wherein the basket walls include a bottom wall having a rear edge, the rear casters having a rotational axis positioned at least 6 inches behind said rear edge.

13. The shopping basket and child carrier of claim 9 wherein the backrest is rotatable to a collapsed position being parallel and immediately adjacent to said seat platform.

14. The shopping basket and child carrier cart assembly of claim 8 wherein the cart having extended lower frame members adapted to provide a wheel base length wherein the plurality of rear casters has a rotational axis positioned below said child carrier.

* * * * *

UNITED STATES PATENT AND TRADEMARK OFFICE
CERTIFICATE OF CORRRECTION

PATENT NO. : 5,918,891
DATED : July 6, 1999
INVENTOR(S) : Joseph W. Russell It is certified that error appears in the above-identified patent and that said Letters Patent is hereby corrected as shown below:

On the title page, insert the following, in item [56]:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 2 | 6 | 1 | 5 | 7 | 2 | 6 | 10/1952 | Brottman | | | |
| | | 2 | 6 | 6 | 2 | 7 | 7 | 5 | 12/1953 | Goldman | | | |
| | | 4 | 4 | 0 | 3 | 8 | 0 | 7 | 09/1983 | Wilkinson et al. | | | |
| | | 4 | 5 | 4 | 1 | 6 | 5 | 4 | 09/1985 | Jonasson | | | |
| | | 5 | 3 | 1 | 0 | 2 | 4 | 2 | 05/1994 | Golder | | | |
| | | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | 2 | 4 | 9 | 7 | 7 | 2 | 1926 | Italy | | | | |
| | | | | | | | | | | | | | |

OTHER DOCUMENTS (Including Author, Title, Date, Pertinent Pages, etc.)

Smith et al., Injuries to Children Related to Shopping Carts, Case Report (4 pages).

Signed and Sealed this

Twenty-sixth Day of October, 1999

Attest:

Attesting Officer

Q. TODD DICKINSON

Acting Commissioner of Patents and Trademarks